United States Patent
McCarthy et al.

(10) Patent No.: US 7,745,373 B2
(45) Date of Patent: Jun. 29, 2010

(54) SINGLE STEP DECOMPOSITION AND ACTIVATION OF NOBLE METAL COMPLEXES ON CATALYTIC SUPPORTS

(75) Inventors: Stephen J. McCarthy, Center Valley, PA (US); William G. Borghard, Haddon Heights, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 396 days.

(21) Appl. No.: 11/388,806

(22) Filed: Mar. 24, 2006

(65) Prior Publication Data

US 2006/0229192 A1  Oct. 12, 2006

Related U.S. Application Data

(60) Provisional application No. 60/669,506, filed on Apr. 8, 2005.

(51) Int. Cl.
*B01J 23/42* (2006.01)
*B01J 23/44* (2006.01)
*B01J 29/068* (2006.01)

(52) U.S. Cl. ............... 502/339; 502/64; 502/87; 502/439

(58) Field of Classification Search ........... 502/87, 502/339, 439, 64
See application file for complete search history.

(56) References Cited

U.S. PATENT DOCUMENTS

| | | | | |
|---|---|---|---|---|
| 3,953,369 A | | 4/1976 | Ohara et al. | |
| 4,303,552 A | * | 12/1981 | Ernest et al. | 502/308 |
| 4,524,051 A | * | 6/1985 | Wright et al. | 423/437.2 |
| 5,286,699 A | * | 2/1994 | Ohata et al. | 502/304 |
| 6,281,160 B1 | | 8/2001 | Basset et al. | |
| 6,555,493 B2 | | 4/2003 | Cooker et al. | |
| 2002/0158229 A1 | * | 10/2002 | Takeda et al. | 252/301.4 R |
| 2003/0062292 A1 | * | 4/2003 | Hantzer et al. | 208/210 |
| 2004/0007506 A1 | * | 1/2004 | Song et al. | 208/244 |

FOREIGN PATENT DOCUMENTS

WO    WO 98/02236    1/1998

OTHER PUBLICATIONS

W. Laufer, et al., "Direct Oxidation of Propylene and Other Olefins on Precious Metal Containing Ti-Catalysts", *Applied Catalysis A: General* 213 (2001), pp. 163-171.

A. Goguet, et al., "Preparation of a Pt/SiO2 Catalyst, II. Temperature-programmed Decomposition of the Adsorbed Platinum Tetrammine Hydroxide Complex Under Flowing Hydrogen, Oxygen, and Argon", *Journal of Catalysis*, 220 (2003), pp. 280-290.

* cited by examiner

*Primary Examiner*—Timothy C Vanoy
*Assistant Examiner*—Daniel Berns
(74) *Attorney, Agent, or Firm*—R. D. Hantman; L. Montalvo

(57) ABSTRACT

The present invention is a method to activate a noble metal complex dispersed on a catalyst support comprising calcining in hydrogen in order to decompose and reduce the noble metal complex in a single step. In a preferred embodiment, the noble metal catalyst is a combination of platinum and palladium and the noble metal complexes are the hydroxides.

6 Claims, No Drawings

SINGLE STEP DECOMPOSITION AND ACTIVATION OF NOBLE METAL COMPLEXES ON CATALYTIC SUPPORTS

This application claims the benefit of U.S. Provisional application 60/669,506 filed Apr. 8, 2005.

BACKGROUND OF THE INVENTION

The present invention relates to a single-step method for the simultaneous decomposition and activation of highly dispersed noble metals on catalytic supports.

Currently, most noble metal catalysts are made by impregnating or exchanging noble metal complexes into or onto a catalytic support. It is dried to remove water and then calcined in air to decompose the highly dispersed noble metal complexes to the noble metal oxides. In a separate step, the noble metal oxides must then be reduced in the presence of hydrogen to produce the active, highly dispersed noble metals. Combining the decomposition and reduction of the noble metal complexes into a single step would significantly reduce the manufacturing cost of noble metal catalysts. The present invention is a method for decomposition and reduction in a single step with noble metal complexes for impregnation or exchange.

SUMMARY OF THE INVENTION

The present invention is a method to decompose and activate a noble metal complex including a noble metal catalyst on a catalyst support.

In a preferred embodiment, the noble metal catalyst is a combination of platinum and palladium on a mesoporous or zeolite support.

In another preferred embodiment, the supported metal catalyst is palladium and platinum supported on MCM-41 bound with alumina, which is described in U.S. Pat. No. 5,098,684.

DETAILED DESCRIPTION OF THE PREFERRED EMBODIMENTS

Many technologies use noble metal catalysts. For example, lube hydrofinishing technologies use both base and noble metal catalysts on an amorphous support. With noble metal catalysts, excellent lube color and oxidation stability are achieved at lower pressures and temperatures and with smaller reactor volumes than required using base metal catalysts. The conventional catalyst described in U.S. Pat. No. 5,098,684 is a lube hydrofinishing catalyst that, compared to competitive catalysts, provides superior aromatic saturation required to meet today's stringent Group II plus and Group III baseoil specifications.

The conventional catalyst consists of platinum and palladium on a catalytic support. Platinum and palladium are finely dispersed over the surface of the support by first absorbing onto the support an aqueous solution of platinum and palladium tetraamine nitrate. The support is dried and then calcined in air to decompose the tetraamines and leaving behind finely dispersed platinum and palladium oxide. In a separate step, the platinum and palladium oxides are reduced in hydrogen to the active noble metals. The reduction step can be done ex-situ during catalyst manufacture or the catalyst can be loaded into the reactor and reduced in-situ. The cost of the separate ex-situ reduction step is very expensive per pound of catalyst. The in-situ reduction can be difficult to implement and causes significant delays in commercial plant startups. Therefore, there is significant incentive to combine the decomposition and reduction of the platinum and palladium tetraamine nitrate into a single step.

To carry out a single step decomposition and reduction, we coated a support with sufficient platinum and palladium tetraamine nitrate to produce what would be a calcined catalyst with 0.3 wt % platinum and 0.9 wt % palladium. The coated catalyst was first dried in air at about 250° F. and second calcined in hydrogen at 300° C. to decompose and reduce the noble metal complexes in a single step. As shown in the table below, the resulting catalyst had significantly lower metal dispersion, as measured by oxygen chemisorption, versus the catalyst prepared by the conventional 2 step method (air calcinations followed by a separate hydrogen reduction). The hydrogen has a concentration between 1 and 100%, alternately, between 4 and 100%.

TABLE 1

| Pt/Pd Complex | Pt, wt % on Catalyst | Pd, wt % on Catalyst | Oxygen Chemisorption, O/M | Decomp/Red Method |
|---|---|---|---|---|
| Tetraamine Nitrate (Base Case 2 - Step) | 0.30 | 0.90 | 0.70 | 2 - Step |
| Tetraamine Nitrate | 0.29 | 0.89 | 0.47 | 1 - Step |
| Tetraamine Chloride | 0.28 | 0.91 | 0.33 | 1 - Step |
| Chloride | 0.30 | 0.88 | 0.29 | 1 - Step |
| Diamino-Dinitrate | 0.28 | 0.91 | 0.55 | 1 - Step |
| Tetraamine Hydroxide | 0.29 | 0.87 | 0.67 | 1 - Step |

We then made additional catalysts by impregnating the same support with different platinum and palladium complexes to the same metal content. Platinum and palladium complexes included chloride and various amine complexes (tetraamine hydroxide, tetraamine chloride, and diaminodinitrate). Following impregnation, the coated catalysts were dried in air at about 250° F. and then calcined in hydrogen at 300° C. to decompose and reduce the noble metal complexes in a single step. As shown in the table above, using the tetraamine chloride, diaminodinitrate, or chloride complexes resulted in significantly lower noble metal dispersions following the single step decomposition and reduction in hydrogen. However, using the tetraamine hydroxide complexes, the noble metal dispersion following the 1-step decomposition by direct reduction in hydrogen was equivalent to the noble metal dispersion via the conventional 2-step decomposition and reduction of the tetraamine nitrate complexes. This set of examples clearly demonstrates that the decomposition and reduction can only be successfully combined into a single step with the proper selection of the noble metal complexes for impregnation or exchange. This leads to the present invention of a single-step method for the simultaneous decomposition and reduction (activation) of highly dispersed noble metals on catalytic supports.

What is claimed is:

1. A single-step method to decompose and activate a noble metal hydroxide complex containing a combination of platinum and palladium metals on a catalyst support containing MCM-41 comprising calcining in hydrogen in order to decompose and reduce the noble metal complexes, wherein said single-step method is substantially equivalent to a conventional two-step method.

2. The method of claim 1 wherein said catalyst support is dried in air prior to activation.

3. The method of claim 2 wherein said drying is performed at a temperature below 300° F.

4. The method of claim 1 wherein said catalyst support is an amorphous support, a mesoporous support or a zeolitic support.

5. The method of claim 1 wherein said hydrogen has a concentration between 1 to 100%.

6. The method of claim 5 wherein said hydrogen has a concentration between 4 and 100%.

* * * * *